(12) United States Patent
Kitamura et al.

(10) Patent No.: US 7,735,477 B2
(45) Date of Patent: Jun. 15, 2010

(54) INTERNAL EGR CONTROL SYSTEM FOR INTERNAL COMBUSTION ENGINE

(75) Inventors: Toru Kitamura, Saitama-ken (JP); Ken Ogawa, Saitama-ken (JP); Toshinari Shinohara, Saitama-ken (JP); Chiho Itoga, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/977,375

(22) Filed: Oct. 24, 2007

(65) Prior Publication Data

US 2008/0092862 A1    Apr. 24, 2008

(30) Foreign Application Priority Data

Oct. 24, 2006  (JP)  .............................. 2006-289252
Oct. 31, 2006  (JP)  .............................. 2006-296716

(51) Int. Cl.
*F02B 47/08*  (2006.01)

(52) U.S. Cl. ................................. 123/568.14

(58) Field of Classification Search ................. 123/295, 123/299, 698, 568.21, 399, 568.2, 305, 568.11, 123/443, 514, 436, 446, 309, 568.19, 298, 123/568.14; 701/104, 108, 103; 73/118.2, 73/115; *F02B 47/08*
See application file for complete search history.

(56) References Cited

U.S. PATENT DOCUMENTS

| | | | | |
|---|---|---|---|---|
| 5,753,805 | A * | 5/1998 | Maloney | 73/118.2 |
| 6,298,835 | B1 * | 10/2001 | Horie et al. | 123/568.21 |
| 6,631,704 | B2 * | 10/2003 | Ogawa et al. | 123/295 |
| 7,000,380 | B2 * | 2/2006 | Tokuyasu et al. | 60/285 |
| 7,353,798 | B2 * | 4/2008 | Tokuda et al. | 123/295 |
| 2004/0045283 | A1 | 3/2004 | Asada | |
| 2005/0217649 | A1 * | 10/2005 | Shimazaki et al. | 123/568.14 |
| 2006/0102158 | A1 * | 5/2006 | Cairns et al. | 123/568.14 |
| 2008/0092862 | A1 * | 4/2008 | Kitamura et al. | 123/568.14 |

FOREIGN PATENT DOCUMENTS

EP    1770265 A2    4/2007

OTHER PUBLICATIONS

European Search Report for Application No. 07018628.3-2311, dated Dec. 20, 2007.

* cited by examiner

*Primary Examiner*—Stephen K Cronin
*Assistant Examiner*—Keith Coleman
(74) *Attorney, Agent, or Firm*—Lahive & Cockfield, LLP; Anthony A. Laurentano, Esq.

(57) ABSTRACT

An internal EGR control system for an internal combustion engine, which is capable of controlling the internal EGR amount with accuracy, when controlling the internal EGR by changing both the exhaust cam phase and the exhaust valve lift. An internal EGR control system for an internal combustion engine controls internal EGR in which combustion gases are caused to remain in a cylinder. An ECU sets a target cam phase serving as a target of the exhaust cam phase, and controls a variable exhaust cam phase mechanism such that the exhaust cam phase becomes equal to the target cam phase. ECU 2 sets a target lift of an exhaust valve according to a detected actual cam phase and calculated valve-closing timing, and controls a variable exhaust valve lift mechanism such that the lift of the exhaust valve becomes equal to the target lift.

8 Claims, 11 Drawing Sheets

INTERNAL EGR CONTROL SYSTEM FOR INTERNAL COMBUSTION ENGINE

BACKGROUND OF THE INVENTION

1. Field of the Invention

The present invention relates to an internal EGR control system for an internal combustion engine, for controlling internal EGR in which combustion gases are caused to remain in cylinders.

2. Description of the Related Art

Conventionally, there has been proposed an internal EGR control system which is disclosed in Japanese Laid-Open Patent Publication (Kokai) No. 2005-127180. This engine is provided with a variable intake valve timing mechanism and a variable exhaust valve timing mechanism both of a hydraulically-driven type, for changing the intake cam phase and the exhaust cam phase with respect to the crankshaft independently of each other. Further, the engine is also provided with an intake valve lift mechanism and an exhaust valve lift mechanism for changing the lift of intake valves and that of exhaust valves.

In the internal EGR control system, the valve overlap amount between each intake valve and the associated exhaust valve is controlled by controlling the above-mentioned variable valve timing mechanisms and the valve lift mechanisms, whereby the internal EGR amount is controlled. More specifically, according to the engine speed and load on the engine, a target valve overlap amount, a target intake cam phase, and a target intake valve lift are calculated, whereby the variable intake valve timing mechanism and the intake valve lift mechanism are controlled such that the target intake cam phase and the target intake valve lift are reached. Further, according to the target valve overlap amount and the actual intake cam phase, the target exhaust cam phase is calculated, and according to the target valve overlap amount and the actual intake valve lift, the target exhaust valve lift is calculated. Then, the variable exhaust valve timing mechanism and the exhaust valve lift mechanism are controlled such that the target exhaust cam phase and the target exhaust valve lift are reached.

However, since the variable exhaust valve timing mechanism is hydraulically driven, the response thereof is easy to vary depending on the operating conditions of the engine. For example, as the hydraulic pressure or oil temperature is lower, the response of the variable exhaust valve timing mechanism is lower, and hence, when the target exhaust cam phase is changed, it takes time before the actual exhaust cam phase converges to the target exhaust cam phase. In contrast, if the exhaust valve lift mechanism is electrically driven, the response thereof is more stable and higher than that of the variable exhaust valve timing mechanism. Therefore, when the target exhaust valve lift is changed, the actual exhaust valve lift converges to the target exhaust valve lift in a shorter time period.

Further, in this conventional internal EGR control system, the variable exhaust valve timing mechanism (target exhaust cam phase) and the exhaust valve lift mechanism (target exhaust valve lift) are both controlled (calculated) according to the target valve overlap amount. Therefore, in the case where the response of the variable exhaust valve timing mechanism is lower than that of the exhaust valve lift mechanism, even if the actual exhaust valve lift has converged to the target exhaust valve lift, the actual valve overlap amount deviates from the target valve overlap amount until the actual exhaust cam phase converges to the target exhaust cam phase, which results in lower control accuracy of the internal EGR amount. Inversely, in the case where the response of the variable exhaust valve timing mechanism is higher than that of the valve lift mechanism, even if the exhaust cam phase has converged to the target exhaust cam phase, the control accuracy of the internal EGR amount is also lower until the exhaust valve lift converges to the target exhaust valve lift.

Particularly, when the control of the internal EGR amount is performed not by valve overlap but by advancing the valve-closing timing of each exhaust valve so as to cause combustion gases to remain in the associated cylinder, the high-temperature internal EGR remains within the cylinder. Therefore, if the control accuracy is low, the combustion state varies, which can undesirably cause instability of combustion.

SUMMARY OF THE INVENTION

It is an object of the present invention to provide an internal EGR control system for an internal combustion engine, which is capable of controlling the internal EGR amount with accuracy, when controlling the internal EGR amount by changing both the exhaust cam phase and the exhaust valve lift.

To attain the above object, in a first aspect of the present invention, there is provided an internal EGR control system for an internal combustion engine, for controlling internal EGR in which combustion gases are caused to remain in a cylinder, by changing an exhaust cam phase as a phase of an exhaust cam for driving an exhaust valve with respect to a crankshaft, using a variable exhaust cam phase mechanism, and changing a lift of the exhaust valve, using a variable exhaust valve lift mechanism, comprising target internal EGR amount-setting means for setting a target internal EGR amount serving as a target of the internal EGR amount, target cam phase-setting means for setting a target cam phase serving as a target of the exhaust cam phase, according to the set target internal EGR amount, phase control means for controlling the variable exhaust cam phase mechanism such that the exhaust cam phase becomes equal to the target cam phase, actual cam phase-detecting means for detecting an actual exhaust cam phase as an actual cam phase, valve-closing timing-calculating means for calculating valve-closing timing of the exhaust valve according to the target internal EGR amount, target lift-setting means for setting a target lift of the exhaust valve according to the detected actual cam phase and the calculated valve-closing timing, and lift control means for controlling the variable exhaust valve lift mechanism such that the lift of the exhaust valve becomes equal to the target lift.

With the configuration of the internal EGR control system according to the first aspect of the present invention, there is carried out internal EGR control in which the exhaust cam phase is changed by the variable exhaust cam phase mechanism, and the lift of the exhaust valve is changed by the variable exhaust valve lift mechanism, whereby combustion gases are caused to remain in the cylinder. The target internal EGR amount is set by the target internal EGR amount-setting means, and the target cam phase is set according to the target internal EGR amount. The variable exhaust cam phase mechanism is controlled such that the exhaust cam phase becomes equal to the target cam phase. Further, the target lift of the exhaust valve lift is set according to the actual cam phase as the detected exhaust cam phase and the valve-closing timing calculated according to the target internal EGR amount, and the variable exhaust valve lift mechanism is controlled such that the lift of the exhaust valve becomes equal to the target lift.

As described above, according to the first aspect of the present invention, the target cam phase is set according to the target internal EGR amount, and the target lift is set according to the actual cam phase and the valve-closing timing of the exhaust valve. Therefore, even when the response of the variable exhaust cam phase mechanism and that of the variable exhaust valve lift mechanism are different from each other, and for example, the response of the variable exhaust cam phase is lower, causing the exhaust cam phase to be late in converging to the target cam phase due to the lower response, it is possible to control the internal EGR amount with accuracy by setting the target lift using the actual cam phase detected of the exhaust cam phase at the time as a parameter.

Preferably, the internal EGR control system further comprises exhaust gas temperature-acquiring means for acquiring temperature of exhaust gases exhausted from the engine, and target internal EGR amount-correcting means for correcting the target internal EGR amount according to the acquired temperature of the exhaust gases, and the target cam phase-setting means sets the target cam phase according to the corrected target internal EGR amount corrected by the target internal EGR amount-correcting means, the valve-closing timing-calculating means calculating the valve-closing timing of the exhaust valve according to the corrected target internal EGR amount.

With the configuration of this preferred embodiment, the target internal EGR amount is corrected by the target internal EGR amount-correcting means according to the temperature of exhaust gases. According to the corrected target internal EGR amount, the target cam phase is set and the valve-closing timing of the exhaust valve is calculated. As the temperature of exhaust gases is higher, the volume of exhaust gases larger. Therefore, by correcting the target internal EGR amount according to the temperature of exhaust gases, the internal EGR amount can be controlled more appropriately while compensating for influence caused by a change in the temperature.

More preferably, the internal EGR control system further comprises exhaust gas pressure-acquiring means for acquiring pressure of the exhaust gases, and the target internal EGR amount-correcting means corrects the target internal EGR amount further according to the acquired pressure of the exhaust gases.

With the configuration of this preferred embodiment, the correction of the target internal EGR amount is carried out not only according to the temperature of exhaust gases but also according to the pressure of exhaust gases, and hence the internal EGR amount can be controlled more appropriately.

Preferably, the internal EGR control system further comprises upper limit value-setting means for setting an upper limit value of the target lift based on the actual cam phase, and target lift-restricting means for restricting the target lift to a value not higher than the set upper limit value.

With the configuration of this preferred embodiment, the upper limit of the target lift is set based on the actual cam phase, and the target lift is restricted by the target lift-restricting means to a value not higher than the set upper limit. Therefore, if the variable exhaust valve lift mechanism is of a type in which the valve-closing timing of the exhaust valve is advanced as the target lift is larger, it is possible to prevent the exhaust valve from starting to open fairly earlier than termination of the expansion stroke. As a consequence, it is possible to prevent pressure in the cylinder in the expansion stroke from being lost, which makes it possible to secure the output of the engine.

To attain the above object, in a second aspect of the present invention, there is provided an internal EGR control system for an internal combustion engine, for controlling internal EGR in which combustion gases are caused to remain in a cylinder, by changing an exhaust cam phase as a phase of an exhaust cam for driving an exhaust valve with respect to a crankshaft, using a variable exhaust cam phase mechanism, and changing a lift of the exhaust valve, using a variable exhaust valve lift mechanism, comprising actual cam phase-detecting means for detecting an actual exhaust cam phase as an actual cam phase, actual lift-detecting means for detecting an actual lift of the exhaust valve as an actual lift, target internal EGR amount-setting means for setting a target internal EGR amount serving as a target of the internal EGR amount, first control means for carrying out a first control in which the variable exhaust cam phase mechanism is controlled according to the set target internal EGR amount, and the variable exhaust valve lift mechanism is controlled according to the detected actual cam phase, second control means for carrying out a second control in which the variable exhaust valve lift mechanism is controlled according to the target internal EGR amount, and the variable exhaust cam phase mechanism is controlled according to the detected actual lift, operating condition-detecting means for detecting an operating condition of the engine, and determination means for determining which of the first control and the second control should be executed, depending on the detected operating condition.

With the configuration of the internal EGR control system according to the second aspect of the present invention, there is carried out internal EGR control in which the exhaust cam phase is changed by the variable exhaust cam phase mechanism, and the lift of the exhaust valve is changed by the variable exhaust valve lift mechanism, whereby combustion gases are caused to remain in the cylinder. The target internal EGR amount is set by the target internal EGR amount-setting means. The first control means carries out the first control in which the variable exhaust cam phase mechanism is controlled according to the set target internal EGR amount, and the variable exhaust valve lift mechanism is controlled according to the detected actual cam phase of the exhaust cam phase. On the other hand, the second control means carries out the second control in which the variable exhaust valve lift mechanism is controlled according to the target internal EGR amount, and the variable exhaust cam phase mechanism is controlled according to the detected actual lift of the exhaust valve. Which of the first control and the second control should be executed is determined by the determination means according to the detected operating condition of the engine.

As described above, according to the second configuration of the present invention, depending on the operating condition of the engine, either of the first control or the second control is executed. For example, when the engine is in an operating condition in which the response of the variable exhaust cam phase mechanism is lower than that of the variable exhaust valve lift mechanism, the first control is carried out. This causes the variable exhaust cam phase mechanism which is lower in response to be controlled according to the target internal EGR amount on a priority basis, and the variable exhaust valve lift mechanism which is higher in response to be controlled using the actual cam phase which is actually detected of the exhaust cam phase as a parameter. Therefore, even if a change in the actual exhaust cam phase is delayed due to delay in the response of the variable exhaust cam phase mechanism, it is possible to control the internal EGR amount with accuracy. Inversely, if the engine is in an operating condition in which the response of the variable exhaust valve lift mechanism is lower than the variable exhaust cam phase mechanism, the second control is carried out whereby the variable exhaust valve lift mechanism is controlled on a priority basis, and the variable exhaust cam phase mechanism is controlled using the actual lift of the exhaust valve attained as a result of the control. Therefore, even when the response of the variable exhaust valve lift mechanism is lower, it is possible to control the internal EGR amount with accuracy.

Preferably, the variable exhaust cam phase mechanism is a hydraulically-driven mechanism that changes the exhaust cam phase by oil pressure.

As described hereinabove, if the variable exhaust cam phase mechanism is of a hydraulically-driven type, the response thereof tends to change depending on operating conditions of the engine. Therefore, the relationship between the response of the variable exhaust cam phase mechanism and that of the variable exhaust valve lift mechanism is changeable as to which is higher, and hence by switching between the first control and the second control according to the relationship, it is possible to properly obtain the advantageous effects of the internal EGR control system according to the second aspect of the present invention.

The above and other objects, features, and advantages of the present invention will become more apparent from the following detailed description taken in conjunction with the accompanying drawings.

DETAILED DESCRIPTION OF PREFERRED EMBODIMENTS

Figure 1:
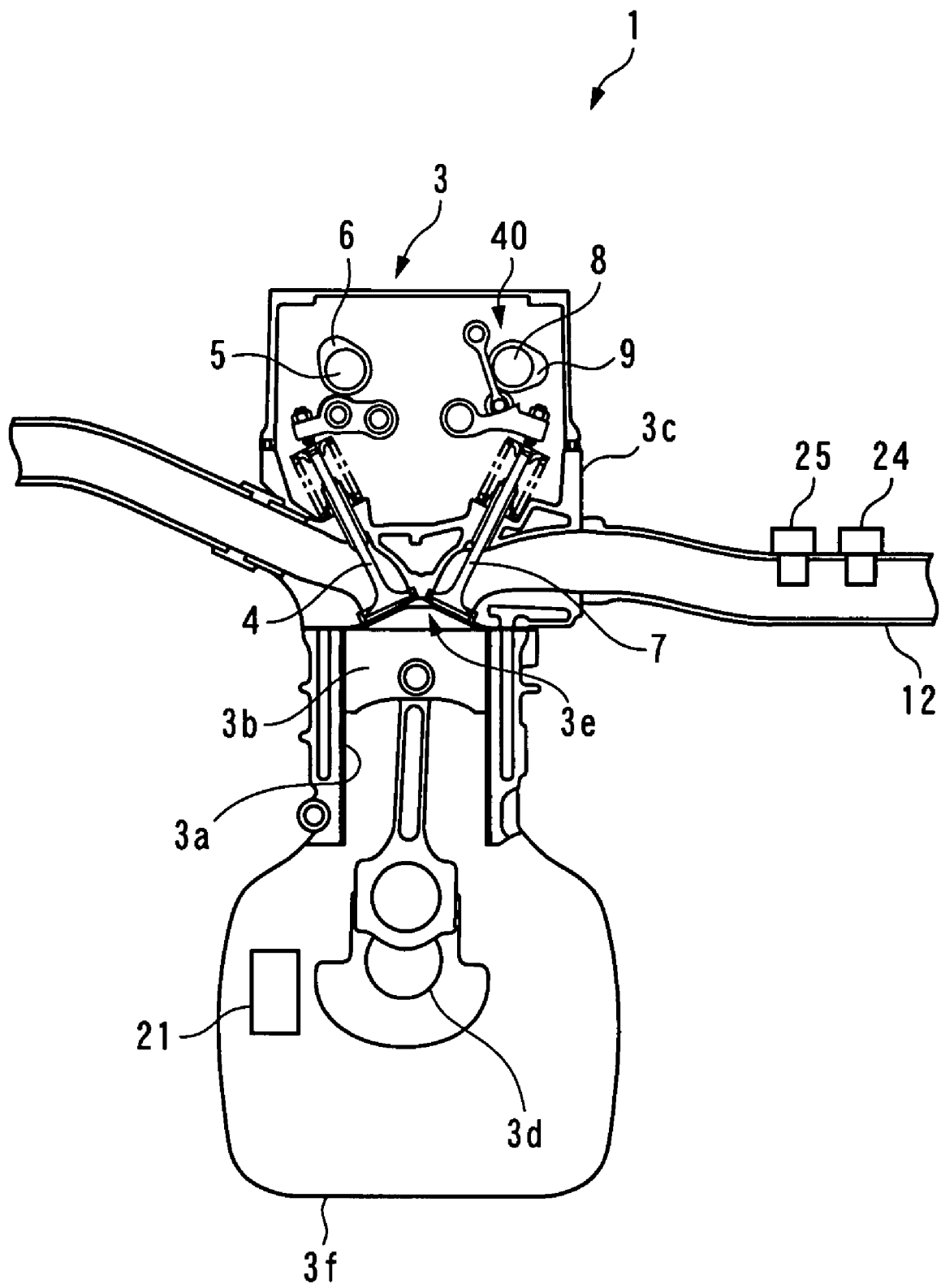
FIG. 1 is a schematic view of an internal EGR control system according to the invention and an engine incorporating the same.

Hereafter, the invention will now be described in detail with reference to drawings showing preferred embodiments thereof. FIG. 1 schematically shows the arrangement of an internal EGR control system 1, and an internal engine (hereinafter referred to as "the engine") 3 to which the internal EGR control system 1 is applied. The engine 3 is an inline four-cylinder gasoline engine installed on an automotive vehicle, not shown, and has four cylinders 3a (only one of which is shown). The engine 3 has a combustion chamber 3e defined between the piston 3b in each cylinder 3a and a cylinder head 3c.

The engine 3 includes a pair of intake valves 4 and 4 (only one of which is shown) and a pair of exhaust valves 7 and 7 (only one of which is shown), provided on a cylinder-by-cylinder basis. Further, the engine 3 includes an intake camshaft 5 on the intake side and intake cams 6 integrally formed with the intake camshaft 5, an exhaust camshaft 8 on the exhaust side and exhaust cams 9 integrally formed with the intake camshaft 8, fuel injection valves 10 (see FIG. 2), and spark plugs 11 (see FIG. 2), and an exhaust-side valve actuating mechanism 40.

The crankshaft 3d of the engine 3 is provided with a crank angle sensor 21. The crank angle sensor 21 (operating condition-detecting means) delivers a pulse of an CRK signal to an ECU 2 whenever the crankshaft 3d rotates through a predetermined crank angle (e.g. 1°). The ECU 2 determines the rotational speed of the engine 3 (hereinafter referred to as "the engine speed") NE based on the CRK signal.

The intake camshaft 5 and the exhaust camshaft 8 are rotatably supported in the cylinder head 3c via respective holders, not shown, such that they extend in the direction of arrangement of the cylinders 3a. The intake camshaft 5 is connected to a crankshaft 3d by a timing chain, not shown. With this arrangement, the intake camshaft 5 rotates one turn per two turns of the crankshaft 3d, and the rotation of the intake cams 6 caused by the rotation of the intake camshaft 5 actuates the intake valves 4 to open and close.

Similarly, the exhaust camshaft 8 is connected to the crankshaft 3d by a timing chain, not shown, and rotates one turn per two turns of the crankshaft 3d. The rotation of the exhaust cams 9 caused by the rotation of the exhaust camshaft 8 actuates the exhaust valves 7 to open and close.

The fuel injection valves 10 are provided for the respective cylinders 3a, and are each mounted through an associated one of the cylinder heads 3c so as to inject fuel directly into the associated combustion chamber 3a. Time over which each fuel injection valve 10 opens, and timing in which the same starts to open are controlled by a drive signal from the ECU 2, whereby the fuel injection amount and fuel injection timing are controlled.

The spark plugs 11 are also provided for the respective cylinders 3a, and are each mounted through an associated one of the cylinder heads 3c. Each of the spark plugs 11 has its discharge conditions controlled by the ECU 2, for burning a mixture within an associated one of the combustion chambers 3e in ignition timing.

Further, the exhaust-side valve actuating mechanism 40 is formed by a variable exhaust cam phase mechanism 50 and a variable exhaust valve lift mechanism 70.

Figure 3:
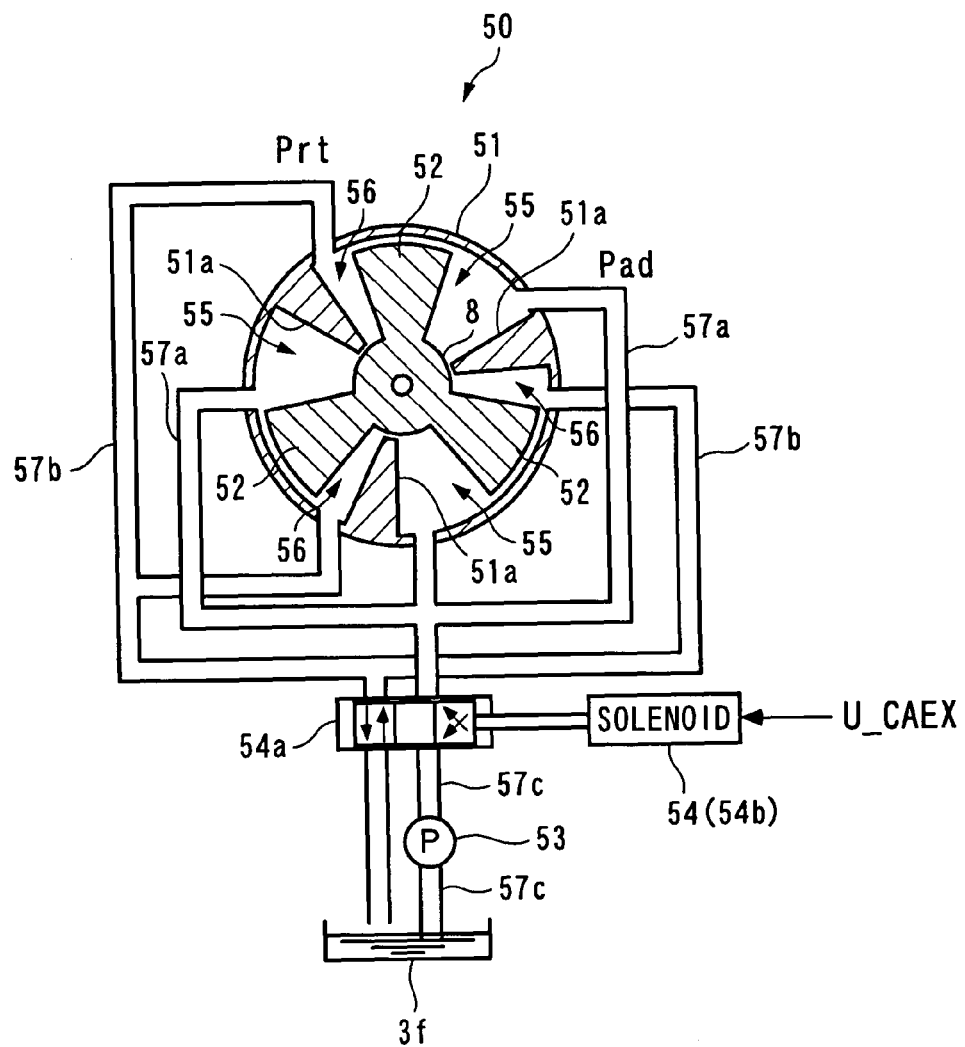
FIG. 3 is a schematic view of a variable exhaust cam phase mechanism.

The variable exhaust cam phase mechanism 50 continuously changes a relative phase of the exhaust camshaft 8 with respect to the crankshaft 3d (hereinafter referred to as "the exhaust cam phase") within a predetermined range, and is provided at the one end of the exhaust camshaft 8 where an exhaust sprocket is mounted. As shown in FIG. 3, the variable exhaust cam phase mechanism 50 includes a housing 51, a three-bladed vane 52, an oil pressure pump 53, and a solenoid valve 54.

The housing 51 is integrally formed with the exhaust sprocket on the exhaust camshaft 8, and is divided by three partition walls 51a formed at equal circumferential intervals. The vane 52 is coaxially mounted on the end of the exhaust camshaft 8 where the exhaust sprocket is mounted, such that the blades of the vane 52 radially extend outward from the exhaust camshaft 8, and are rotatably housed in the housing 51. Further, the housing 51 has three advance chambers 55 and three retard chambers 56 each formed between one of the partition walls 51a and one of the three blades of the vane 52.

The oil pressure pump 53 is a mechanical one connected to the crankshaft 3d. As the crankshaft 3d rotates, the oil pressure pump 53 draws lubricating oil stored in an oil pan 3f of the engine 3 via a lower part of an oil passage 57c, pressurizes the same, and then supplies the pressurized oil to the solenoid valve 54 via the remaining part of the oil passage 57c.

The solenoid valve 54 is formed by combining a spool valve mechanism 54a and a solenoid 54b, and is connected to the advance chambers 55 and retard chambers 56 via an advance oil passage 57a and a retard oil passage 57b so as to control oil pressure Poil supplied from the oil pressure pump 53 and deliver the same to the advance chambers 55 and the retard chambers 56 as advance oil pressure Pad and retard oil pressure Prt. The solenoid 54b of the solenoid valve 54 is responsive to a phase control input U_CAEX, referred to hereinafter, from the ECU 2, for moving a spool valve element of the spool valve mechanism 54a within a predetermined range of motion to thereby change both the advance oil pressure Pad and the retard oil pressure Prt.

Figure 4:
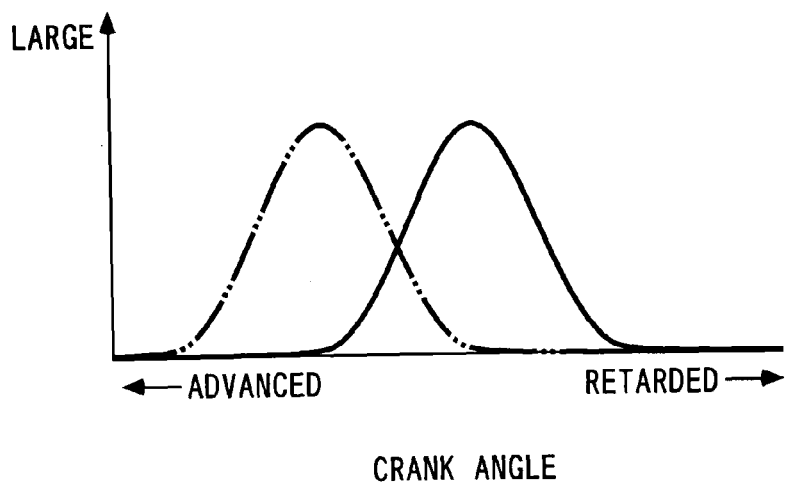
FIG. 4 is a diagram of valve lift curves of an exhaust valve depicted in respective cases where the variable exhaust cam phase mechanism sets an exhaust cam phase to a most retarded value (solid line) and a most advanced value (two dot-chain line)

In the variable exhaust cam phase mechanism 50 configured as above, during operation of the oil pressure pump 53, the solenoid valve 54 is operated according to the phase control input U_CAEX, to supply the advance oil pressure Pad to the advance chambers 55 and the retard oil pressure Prt to the retard chambers 56, whereby the relative phase of the vane 52 with respect to the housing 51 is changed toward an advanced side or a retarded side. As a result, the aforementioned exhaust cam phase is continuously changed between a predetermined most retarded value and a predetermined most advanced value, whereby the valve timing of the exhaust valves 7 is continuously changed between most retarded timing indicated by a solid line in FIG. 4 and most advanced timing indicated by a two-dot chain line in FIG. 4.

A cam angle sensor 22 (see FIG. 2) is disposed at the other end of the exhaust camshaft 8, opposite to the end where the variable exhaust cam phase mechanism 50 is disposed. The cam angle sensor 22 (actual cam phase-detecting means) delivers an EXCAM signal, which is a pulse signal, to the ECU 2 along with rotation of the exhaust camshaft 8. Each pulse of the EXCAM signal is generated whenever the exhaust camshaft 8 rotates through a predetermined cam angle (e.g. 1°), and the ECU 2 calculates an exhaust cam phase CAEX (actual cam phase) based on the EXCAM signal and the aforementioned CRK signal.

Figure 5:
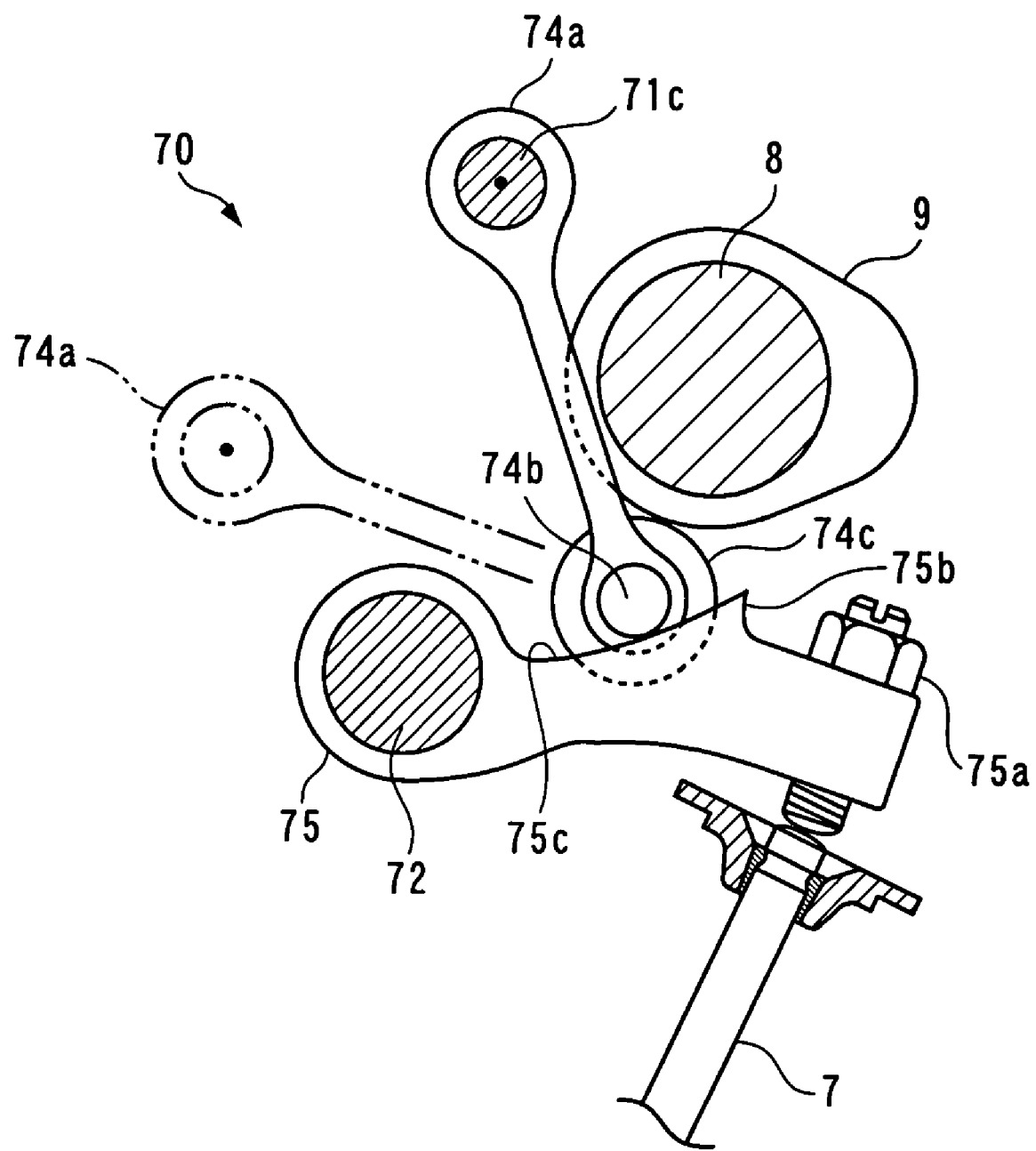
FIG. 5 is a schematic view of a variable exhaust valve lift mechanism.
Figure 6:
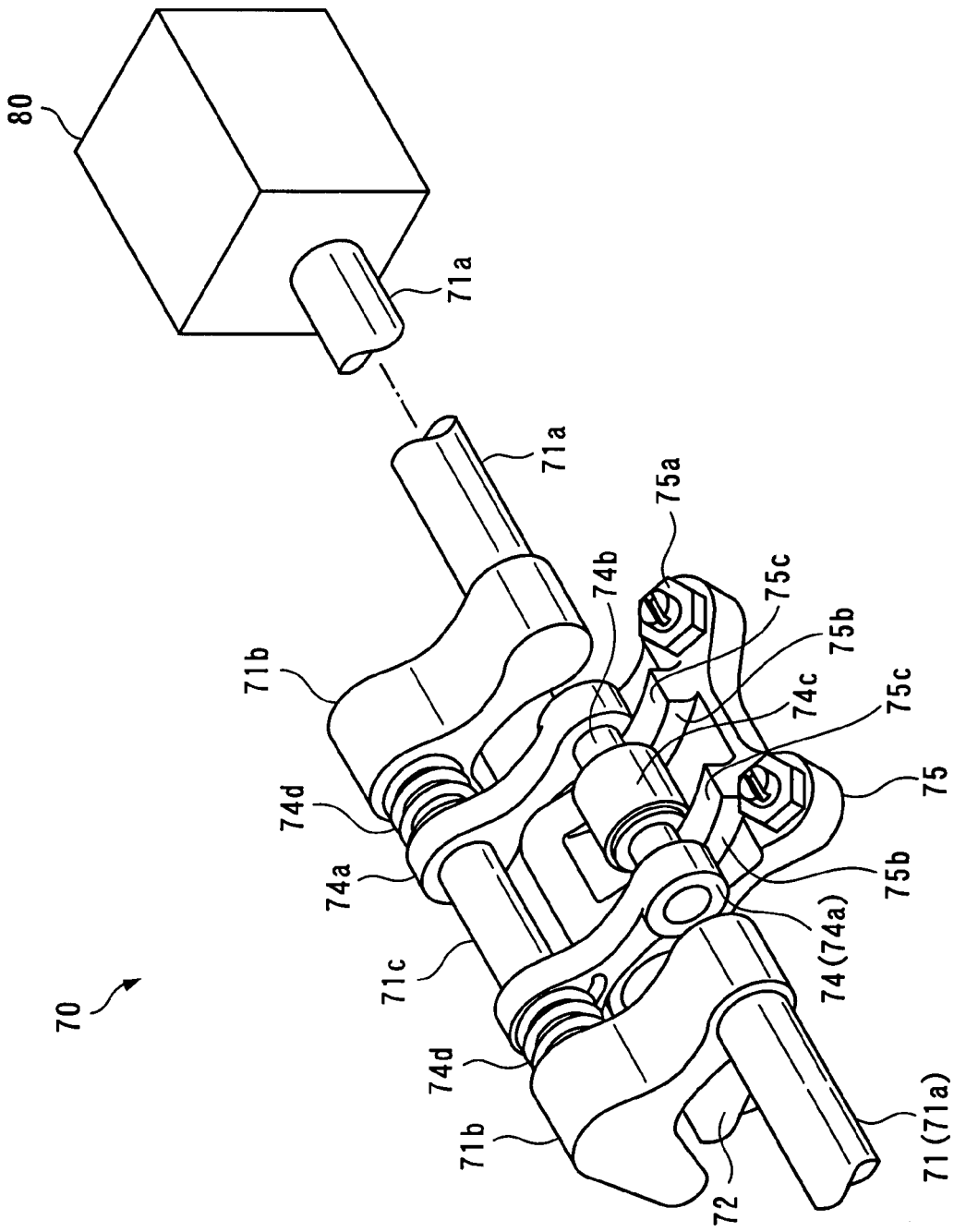
FIG. 6 is a fragmentary perspective view of the variable exhaust valve lift mechanism.

Further, the exhaust valve lift mechanism 70 continuously changes the lift of the exhaust valves 7 (hereinafter referred to as "the exhaust valve lift") between a value of 0 and a predetermined maximum value. As shown in FIGS. 5 and 6, the variable exhaust valve lift mechanism 70 is comprised of a control shaft 71 and a rocker arm shaft 72, upper and lower rocker arms 74 and 75 fitted on theses shafts 71 and 72, for each cylinder 3a, and an actuator 80 for actuating the upper and lower rocker arms 74 and 75. It should be noted that in the present embodiment, the exhaust valve lift represents the maximum lift (lift amount) of the exhaust valves 7.

The control shaft 71 is comprised of pivot parts 71a, holder parts 71b, and eccentric shaft parts 71c, which are assembled into a unit. The control shaft 71 extends parallel with the exhaust camshaft 8, and is rotatably supported by the cylinder heads 3c, with one end of the unit connected to the actuator 80.

The upper rocker arm 74 is comprised of a pair of links 74a and 74a, a roller shaft 74b, a roller 74c, and a pair of coil springs 74d and 74d. The roller shaft 74b has opposite ends thereof rotatably supported by respective one ends of the links 74a and 74a, respectively. The roller 74c is rotatably fitted on the roller shaft 74b.

The other ends of the respective links 74a are pivotally fitted on the eccentric shaft part 71c of the control shaft 71, and are each connected to an associated one of the holder parts 71b via an associated one of the coil springs 74d. The roller 74c is brought into contact with the cam surface of the exhaust cam 9 by the urging forces of the respective coil springs 74d acting on the links 74a, respectively. Further, when the roller 74c is in contact with the circular base part of the cam surface of the exhaust cam 9, the roller shaft 74b is held in its original position (i.e. the position shown in FIG. 5) where the axis of the roller shaft 74b is aligned with the axis of the pivot part 71a.

The lower rocker arm 75 is configured such that one end thereof is pivotally supported by the rocker arm shaft 72, and the other end thereof has adjusting bolts 75a and 75a inserted therethrough. Between the adjusting bolts 75a and the respective associated exhaust valves 7, there is provided a predetermined tappet clearance.

Further, the lower rocker arm 75 has a pair of guide parts 75b and 75b projecting upward. Each of the guide parts 75b has an upper surface thereof formed as a guide surface 75c for guiding the roller shaft 74b of the upper rocker arm 74, and is held in contact with the roller shaft 74b via the guide surface 75c. The guide surface 75c has an arcuate shape which protrudes downward and is concentric with the eccentric shaft part 71c, i.e. coincides with the arc drawn about the axis of the eccentric shaft part 71c when the links 74a are in the valve-closing position indicated by solid lines in FIG. 5. In the state where the guide parts 75b are in contact with the roller shaft 74b, the roller 74c is positioned between the guide parts 75b and 75b, and is held in contact only with the exhaust cam 9 without being brought into contact with the lower rocker arm 75.

The actuator 80 is implemented by a combination of a motor, not shown, and a reduction gear mechanism, not shown. When driven by the ECU 2, the actuator 80 causes the control shaft 71 to pivotally move about the axis of the pivot parts 71a. As the control shaft 71 pivotally moves, the links 74a pivotally move about the roller shaft 74b.

Next, a description will be given of the operation of the variable exhaust valve lift mechanism 70 configured as above. In the variable exhaust valve lift mechanism 70, when the actuator 80 is driven by a lift control input U_SAAEX, referred to hereinafter, from the ECU 2, the control shaft 71 starts pivotal motion. When the control shaft 71 is thus pivotally moved, a turning angle SAAEX of the control shaft 71 is limited within a predetermined range, whereby e.g. when the roller shaft 74b is in the aforementioned original position, the turning range of the links 74a is also limited between the zero lift position indicated by the solid line in FIG. 5 and a maximum lift position indicated by a two-dot chain line in FIG. 5.

When the links 74a are in the zero lift position, if the exhaust cam 9 rotates to push the roller 74c by the cam nose thereof toward the rocker arm shaft 72, the links 74a pivotally move clockwise, as viewed in FIG. 5, about the eccentric shaft part 71c. In this case, since the guide surfaces 75c of the lower rocker arm 75 each have the shape which coincides with the arc drawn about the axis of the eccentric shaft part 71c, as described hereinabove, the lower rocker arm 75 is held in the valve-closing position shown in FIG. 5. This holds the exhaust valve lift at a value of 0, whereby the exhaust valves 7 are held in the closed state.

On the other hand, when the links 74a have been pivotally moved from the zero lift position to a position toward the maximum lift position, the rotation of the exhaust cam 9 causes the links 74a to pivotally move clockwise, as viewed in FIG. 5, about the eccentric shaft part 71c, whereby the lower rocker arm 75 is caused to pivotally move downward from the valve-closing position in FIG. 5 to open the exhaust valves 7. In this case, the amount of pivotal motion of the lower rocker arm 75, i.e. the exhaust valve lift, becomes larger as the links 74a are in a position closer to the maximum lift position.

Figure 7:
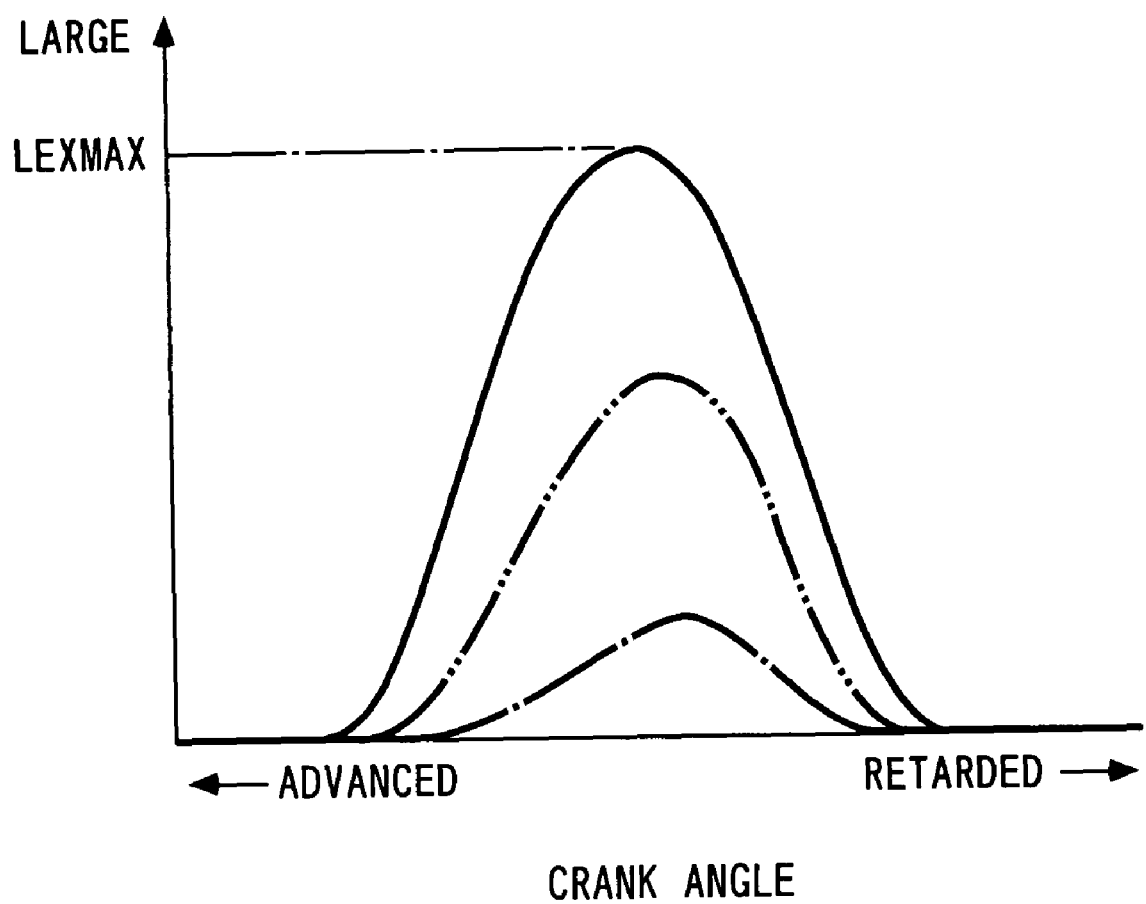
FIG. 7 is a view of a state of the exhaust valve lift changed by the variable exhaust valve lift mechanism.

As described above, the exhaust valves 7 open with a larger lift as the links 74a are in a position closer to the maximum lift position. More specifically, during rotation of the exhaust cam 9, when the links 74a are in the maximum lift position, the exhaust valves 7 open in accordance with a valve lift curve indicated by a solid line in FIG. 7, and the exhaust valve lift shows its maximum value LEXMAX. Therefore, the variable exhaust valve lift mechanism 70 is capable of pivotally moving the links 74a between the zero lift position and the maximum lift position by the actuator 80 to thereby continuously change the exhaust valve lift between a value of 0 and the predetermined maximum value LEXMAX. Further, when the exhaust cam phase CAEX remains the same, as the exhaust valve lift is larger, the valve-opening timing of the exhaust valves 7 becomes earlier, and the valve-closing timing of the same becomes later.

Figure 2:
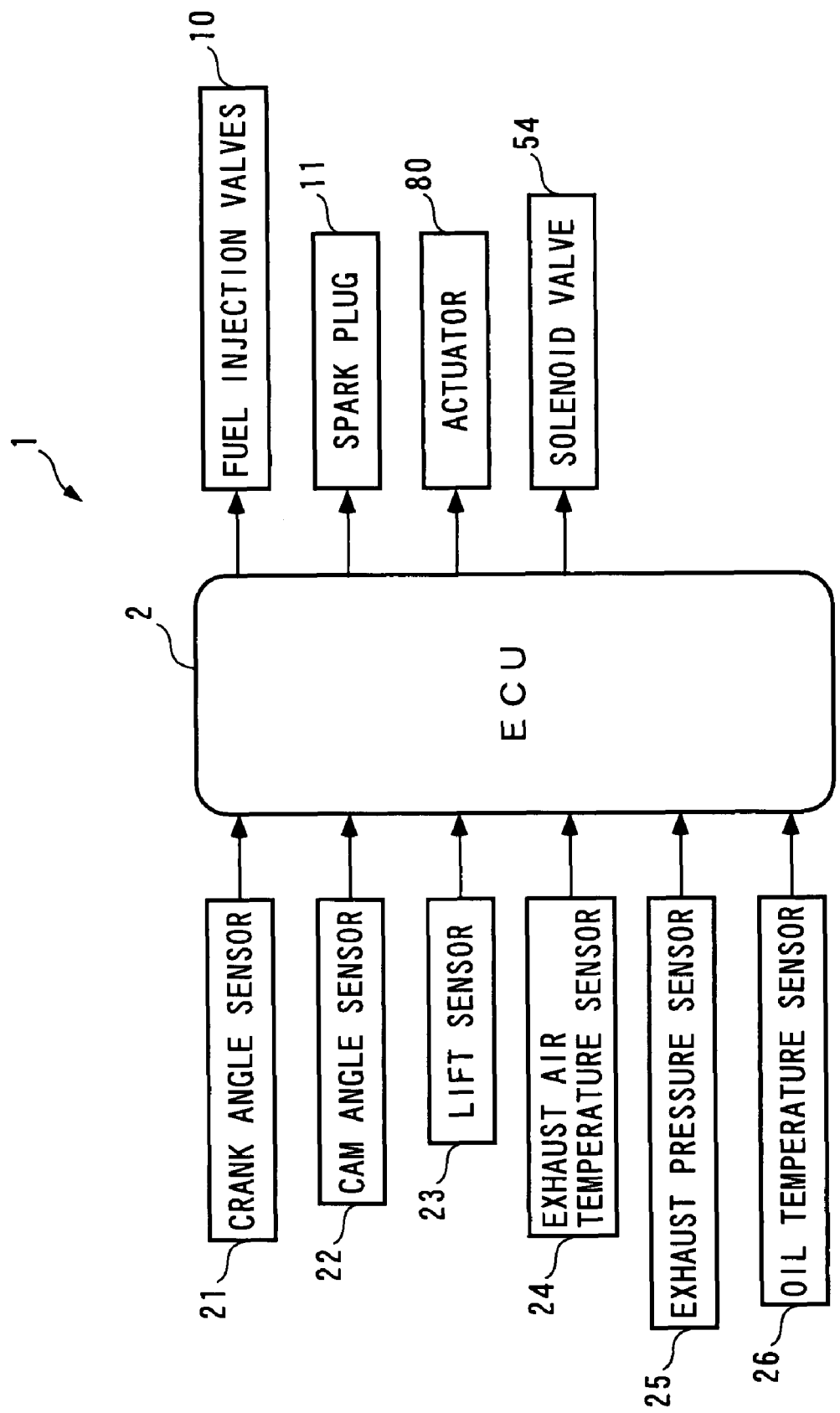
FIG. 2 is a view of part of the internal EGR control system.

Further, the variable exhaust valve lift mechanism 70 is provided with a lift sensor (actual lift-detecting means) 23 for detecting the exhaust valve lift (see FIG. 2). This lift sensor 23 detects the turning angle SAAEX (actual lift) of the control shaft 71, and delivers a signal indicative of the detected turning angle SAAEX to the ECU 2. As described above, the exhaust valve lift is unconditionally determined by the turning angle SAAEX of the control shaft 71, and hence the detected turning angle SAAEX represents the actual exhaust valve lift.

As described above, in the engine 3, the exhaust-side valve actuating mechanism 40 is capable of continuously changing the valve timing and valve lift, and hence the amount of combustion gases remaining in the combustion chamber 3c after the combustion stroke (hereinafter referred to as "the internal EGR amount") can be varied as desired. For example, the internal EGR amount assumes a value of 0 when the exhaust cam phase CAEX is in the most retarded angle position, and the exhaust valve lift is at the maximum value LEXMAX. On the other hand, as the exhaust cam phase CAEX is more advanced, the valve-closing timing of the exhaust valves 7 becomes earlier, and hence the internal EGR amount becomes larger. Further, as the exhaust valve lift is smaller, the amount of exhausted combustion gases becomes smaller, and hence the internal EGR amount becomes larger. As is clear from the above, in the present embodiment, each exhaust valve 7 is caused to close before the associated intake valve 4 starts to open, to thereby cause the combustion gases to remain in the combustion chamber 3e to thereby obtain the internal EGR.

Further, in the exhaust pipe 12 of the engine 3, there are provided an exhaust air temperature sensor 24 and an exhaust pressure sensor 25, from upstream to downstream in the mentioned order. The exhaust air temperature sensor 24 detects temperature TEX of the inside of the exhaust pipe 21 (hereinafter referred to as "exhaust temperature"), and the exhaust pressure sensor 25 detects pressure PEX within the exhaust pipe 12 (hereinafter referred to as "exhaust pressure"). Signals indicative of the detected exhaust temperature TEX and intake pressure PEX are delivered to the ECU 2.

Further, an oil temperature sensor 26 (operating condition-detecting means) detects temperature TOIL of lubricating oil used as operating oil for the variable exhaust cam phase mechanism 50 (hereinafter referred to as "oil temperature"), and delivers a signal indicative of the detected oil temperature TOIL to the ECU 2.

The ECU 2 is formed by a micro computer comprised of an I/O interface, a CPU, a RAM, and a ROM. The ECU 2 carries out control of the engine 3, including control of the fuel injection amount, based on control programs stored in the ROM according to the signals from the aforementioned various sensors 21 to 26. Further, the ECU 2 controls the exhaust-side valve actuating mechanism 40 to thereby control the internal EGR amount. The ECU 2 implements target internal EGR amount-setting means, target cam phase-setting means, phase control means, actual cam phase-detecting means, valve-closing timing-calculating means, target lift-setting means, lift control means, target internal EGR amount-correcting means, upper limit value-setting means, target lift-restricting means, actual lift-detecting means, first control means, second control means, operating condition-detecting means, and determination means.

Figure 8:
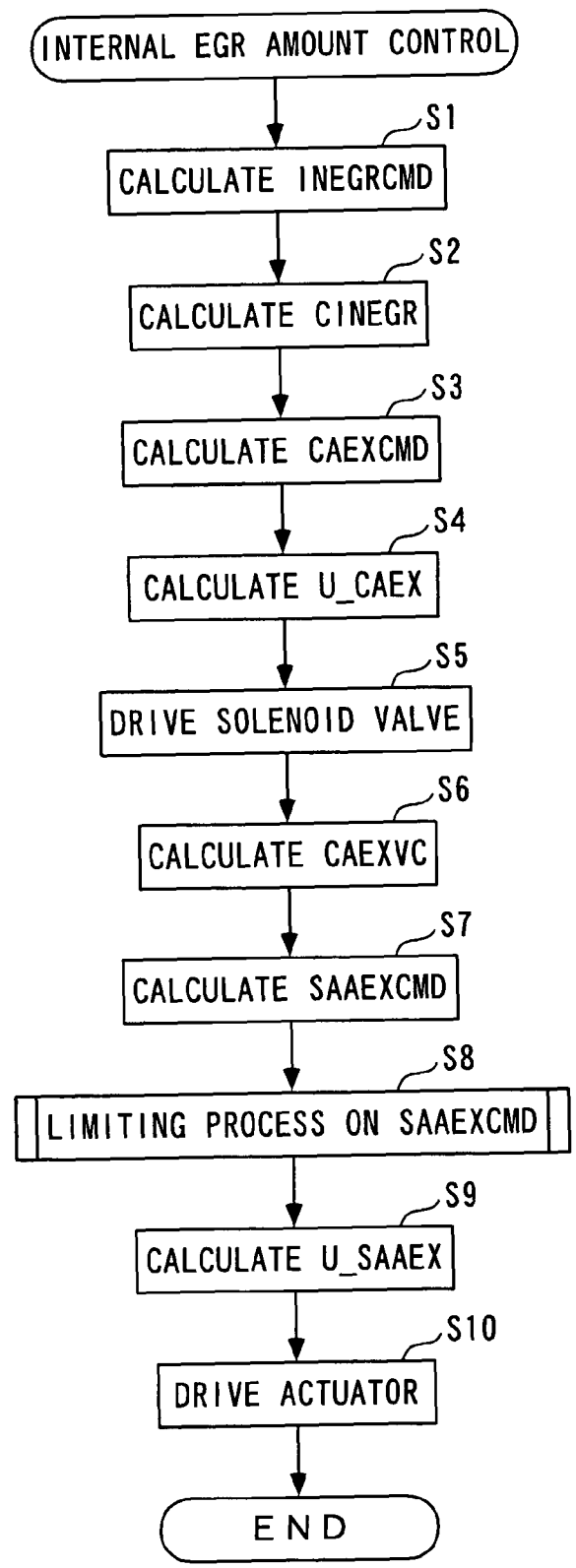
FIG. 8 is a flowchart showing a process for controlling the internal EGR amount.

FIG. 8 is a flowchart showing a process for controlling the internal EGR amount, which is executed by the ECU 2. This process is executed whenever a predetermined time period elapses. First, in a step 1 (shown as S1 in abbreviated form in FIG. 8; the following steps are also shown in abbreviated form), a map (not shown) is searched according to the engine speed NE and the demanded torque PMCMD, to thereby calculate a target internal EGR amount INEGRCMD serving as a target of the internal EGR amount.

Next, the target internal EGR amount INEGRCMD is corrected according to the detected exhaust air temperature TEX and exhaust pressure PEX using a characteristic equation of gas (PV=nRT) to thereby calculate a corrected target internal EGR amount CINEGR (step 2).

Next, a map (not shown) is searched according to the calculated corrected target internal EGR amount CINEGR and the engine speed NE to thereby calculate a target cam phase CAEXCMD serving as a target of the exhaust cam phase CAEX (step 3). Then, a phase control input U_CAEX is calculated according to the calculated target cam phase CAEXCMD and the actual exhaust cam phase CAEX (step 4), and the solenoid valve 54 is driven according to the calculated phase control input U_CAEX (step 5). Thus, the exhaust cam phase CAEX is controlled such that it becomes equal to the target cam phase CAEXCMD.

Next, according to the corrected target internal EGR amount CINEGR, a table (not shown) is searched to thereby calculate a valve-closing crank angle CAEXVC corresponding to the valve-closing timing of each exhaust valve 7 (step 6), and a target turning angle SAAEXCMD serving as a target of the turning angle SAAEX of the control shaft 71 is calculated according to the valve-closing crank angle CAEXVC and the exhaust cam phase CAEX (step 7). Next, a limiting process is carried out on the calculated target turning angle SAAEXCMD (step 8).

Figure 9:
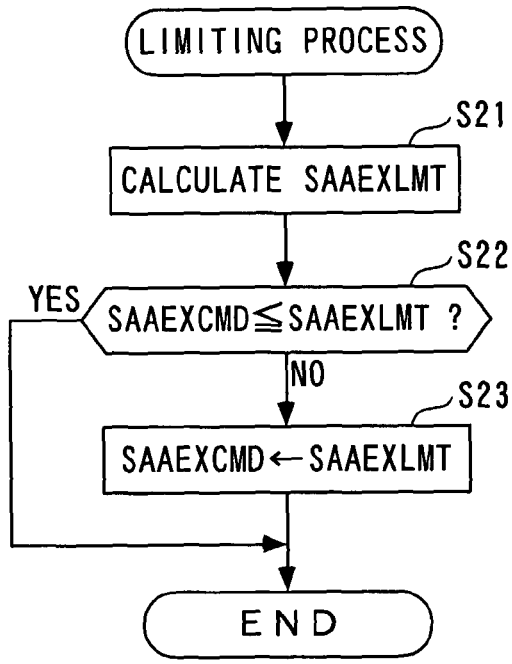
FIG. 9 is a flowchart showing a limiting process.
Figure 10:
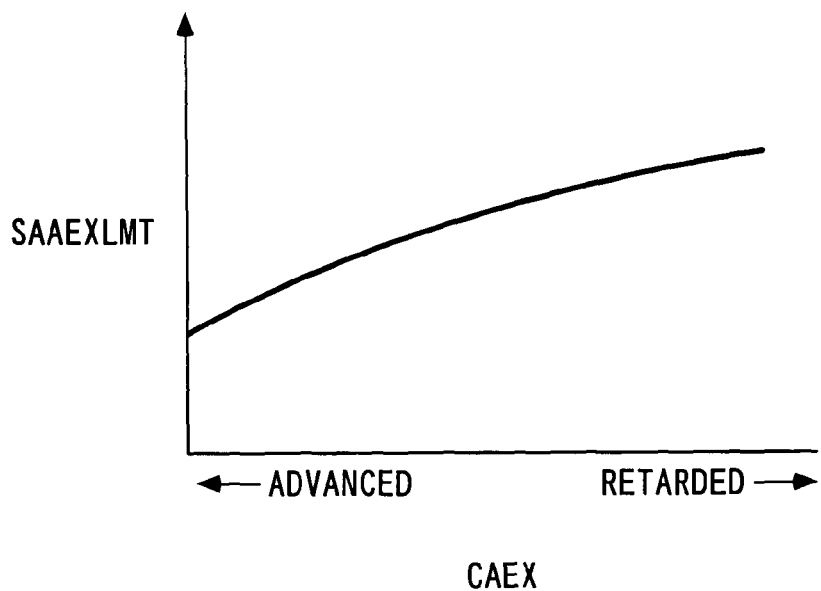
FIG. 10 is a view showing an example of a table for use in calculating an upper limit value used in the FIG. 9 limiting process.

FIG. 9 is a flowchart showing the limiting process for the target turning angle SAAEXCMD. In the present process, first, in a step 21, according to the exhaust cam phase CAEX, a table shown in FIG. 10 is searched to thereby calculate an upper limit value SAAEXLMT of the target turning angle SAAEXCMD. Since, as described above, the variable exhaust valve lift mechanism 70 is of a type in which as the exhaust valve lift becomes larger, the valve-opening timing of the exhaust valve 7 is advanced, the upper limit value SAAEXLMT is set so as to prevent the exhaust valve 7 from starting to open fairly before termination of the expansion stroke. Therefore, since the exhaust cam phase CAEX is advanced, the valve-opening timing of the exhaust valves 7 is advanced, and hence, in this table, the upper limit SAAEXLMT is set to a smaller value.

Next, it is determined whether or not the target turning angle SAAEXCMD is not higher than the upper limit value SAAEXLMT (step 22). If the answer to this question is affirmative (YES), the present process is immediately terminated, whereas if the same is negative (NO), i.e. if SAAEXCMD>SAAEXLMT holds, the target turning angle SAAEXCMD is set to the upper limit value SAAEXLMT (step 23), followed by terminating the present process.

Referring again to FIG. 8, in a step 9 following the step 8, the lift control input U_SAAEX is calculated according to the turning angle SAAEX and the target turning angle SAAEXCMD. Next, the actuator 80 is driven according to the lift control input U_SAAEX (step 10). Thus, the turning angle SAAEX is controlled such that it becomes equal to the target turning angle SAAEXCMD.

As described above, according to the present embodiment, the target cam phase CAEXCMD is calculated according to the target internal EGR amount INEGRCMD, and the target turning angle SAAEXCMD, i.e. the target lift of the exhaust valves 7 is calculated according to the exhaust cam phase CAEX and the valve-closing crank angle CAEXVC. Thus, the exhaust cam phase CAEX is used as a parameter for setting the target lift of the exhaust valves 7. Therefore, even when the exhaust cam phase CAEX is late in converging to the target cam phase CAEXCMD due to the lower response of the hydraulically-driven variable exhaust cam phase mechanism 50 than that of the electrically-driven variable exhaust valve lift mechanism 70, the target turning angle SAAEXCMD can be calculated using the actual exhaust cam phase CAEX as a parameter, which makes it possible to control the internal EGR amount with accuracy.

Further, since the target internal EGR amount INEGRCMD is corrected according to the exhaust air temperature TEX and the exhaust pressure PEX, it is possible to control the internal EGR amount more appropriately while compensating for influence caused by exhaust temperature TEX and intake pressure PEX.

Further, since the upper limit value SAAEXLMT of the target turning angle SAAEXCMD of the control shaft 71 is calculated based on the exhaust cam phase CAEX, it is possible to prevent each exhaust valve 7 from starting to open fairly before termination of the expansion stroke of the associated cylinder 3a. As a consequence, it is possible to prevent pressure in the cylinder 3a from being largely lost in the expansion stroke, thereby securing the output of the engine 3.

Next, an internal EGR control system 1 according to a second embodiment of the present invention will be described with reference to FIGS. 11 to 13. The present embodiment is distinguished from the first embodiment only in a process for controlling the internal EGR amount, which is executed by the ECU 2. Therefore, components of the present embodiment corresponding to those of the first embodiment are designated by the same reference numerals, and description thereof is omitted. The control process will be described hereinafter.

Figure 11:
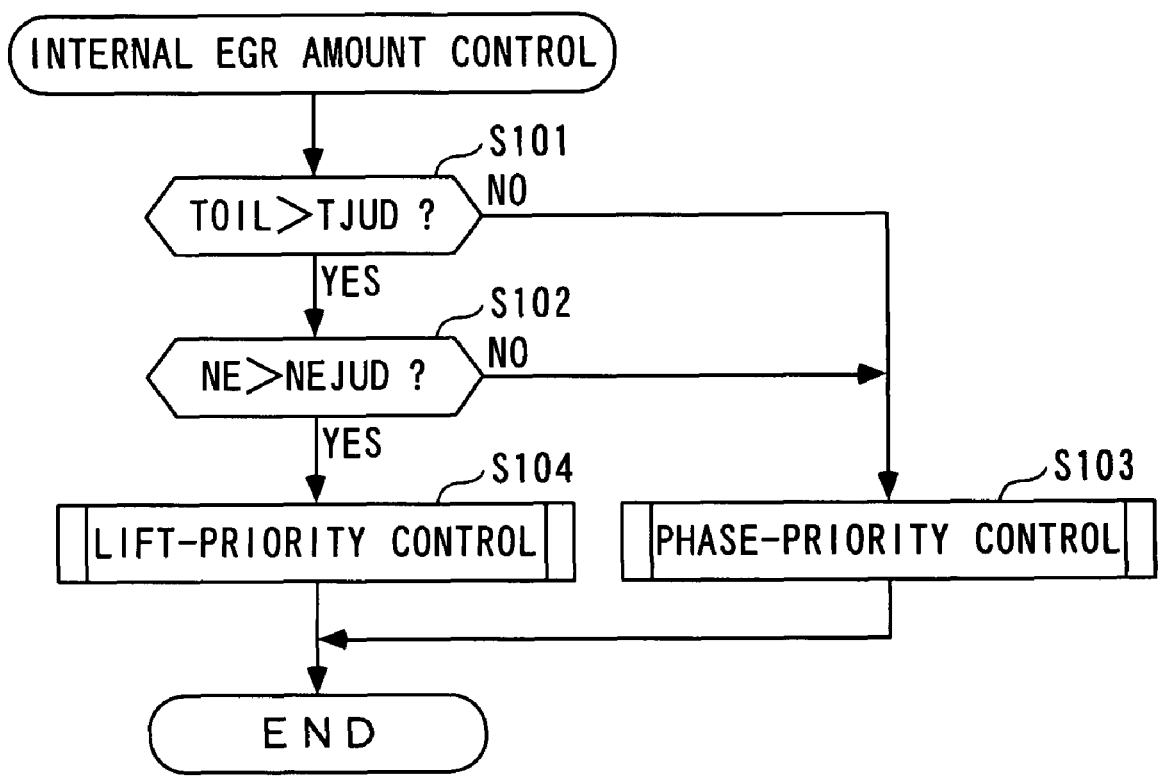
FIG. 11 is a flowchart showing a process for controlling the internal EGR amount, which is executed by an internal EGR control system according to a second embodiment of the present invention.

FIG. 11 is a flowchart showing the process for controlling the internal EGR amount, which is executed by the ECU 2 of the internal EGR control system 1 according to the present embodiment. This process is executed whenever a predetermined time period elapses. First, in a step 101, it is determined whether or not the oil temperature TOIL of lubricating oil is higher than a predetermined temperature TJUD (e.g. 70° C.). If the answer to this question is negative (NO), it is judged that the response of the variable exhaust cam phase mechanism 50 is lower than that of the variable exhaust valve lift mechanism 70, a phase-priority control process, described hereinafter, is carried out in which the variable exhaust cam phase mechanism 50 is controlled on a priority basis (step 103), followed by terminating the present process.

On the other hand if the answer to the question of the step 101 is affirmative (YES), it is determined whether or not the engine speed NE is higher than a predetermined engine speed NEJUD (e.g. 3000 rpm) (step 102). If the answer to this question is negative (NO), the degree of increase in the pressure of lubricating oil by the oil pressure pump 53 driven by the crankshaft 3d is small, causing the oil pressure of the lubricating oil to remain lower, and hence it is also judged that the response of the variable exhaust cam phase mechanism 50 is lower than that of the variable exhaust valve lift mechanism 70, so that the step 103 is executed.

On the other hand, if both the answers to the questions of the steps 101 and 102 are affirmative (YES), both the oil temperature and oil pressure of lubricating oil are high enough, and hence it is judged that the response of the variable exhaust valve lift mechanism 70 is lower than that of the variable exhaust cam phase mechanism 50, a lift-priority control process, described hereinafter, is carried out in which the variable exhaust valve lift mechanism 70 is controlled on a priority basis (step 104), followed by terminating the present process.

Figure 12:
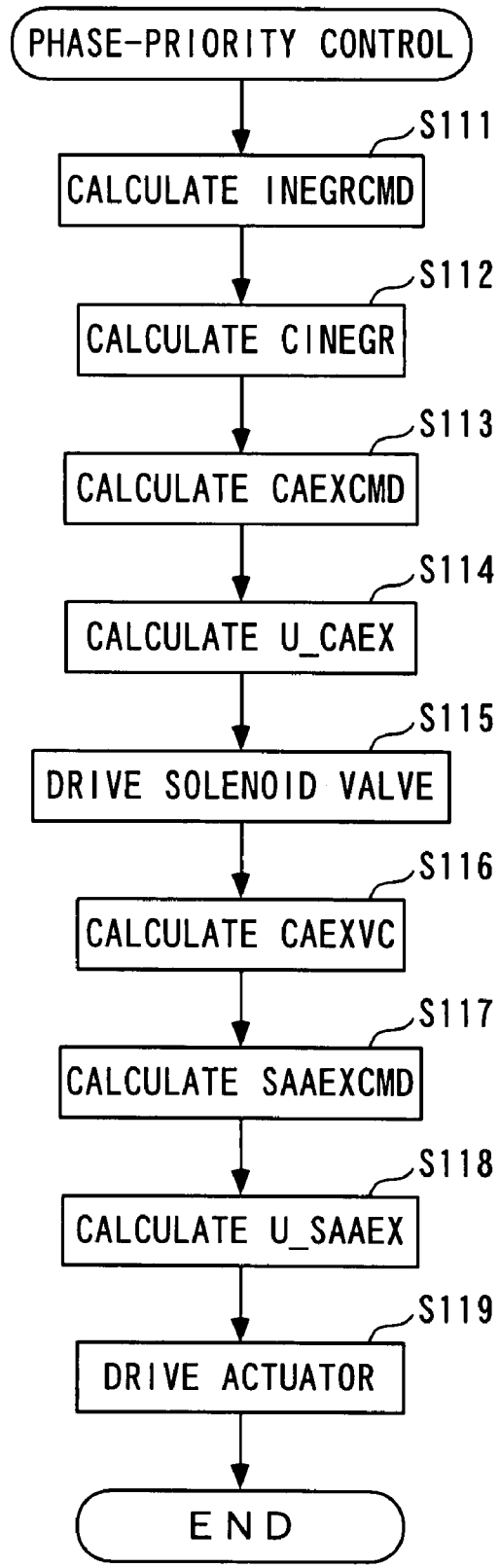
FIG. 12 is a flowchart showing a phase-priority control process executed in the FIG. 11 process.

FIG. 12 is a flowchart showing the phase-priority control process executed in the step 103 in FIG. 11.

In the present process, first, in a step 111, a map (not shown) is searched according to the engine speed NE and the demanded torque PMCMD, to thereby calculate a target internal EGR amount INEGRCMD serving as a target of the internal EGR amount.

Next, the target internal EGR amount INEGRCMD is corrected according to the detected exhaust air temperature TEX and exhaust pressure PEX using a characteristic equation of gas (PV=nRT) to thereby calculate a corrected target internal EGR amount CINEGR (step 112).

Next, a map (not shown) is searched according to the calculated corrected target internal EGR amount CINEGR and the engine speed NE to thereby calculate a target cam phase CAEXCMD serving as a target of the exhaust cam phase CAEX (step 113). Then, a phase control input U_CAEX is calculated according to the calculated target cam phase CAEXCMD and the actual exhaust cam phase CAEX (step 114), and the solenoid valve 54 is driven according to the calculated phase control input U_CAEX (step 115). Thus, the exhaust cam phase CAEX is controlled such that it becomes equal to the target cam phase CAEXCMD.

Next, according to the corrected target internal EGR amount CINEGR, a table (not shown) is searched to thereby calculate a valve-closing crank angle CAEXVC corresponding to the valve-closing timing of the exhaust valve 7 (step 116), and a target turning angle SAAEXCMD serving as a target of the turning angle SAAEX of the control shaft 71 is calculated according to the valve-closing crank angle CAEXVC and the exhaust cam phase CAEX (step 117).

Next, a lift control input U_SAAEX is calculated according to the turning angle SAAEX and the target turning angle SAAEXCMD (step 118). Next, the actuator 80 is driven according to the calculated lift control input U_SAAEX (step 119). Thus, the turning angle SAAEX is controlled such that it becomes equal to the target turning angle SAAEXCMD.

Figure 13:
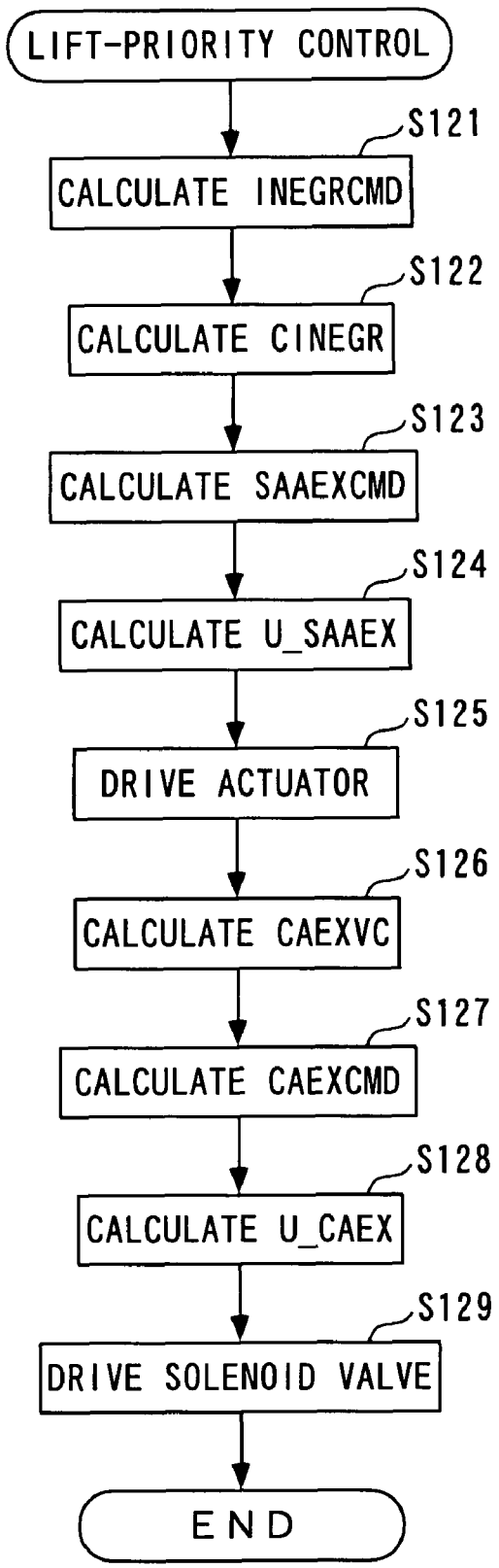
FIG. 13 is a flowchart showing a lift-priority control process executed in the FIG. 11 process.

FIG. 13 is a flowchart showing the lift-priority control process executed in the step 104 in FIG. 11. In the present process, first, in steps 121 and step 122, similarly to the steps 111 and 112, a map (not shown) is searched according to the engine speed NE and the demanded torque PMCMD to thereby calculate a target internal EGR amount INEGRCMD, and a corrected target internal EGR amount CINEGR is calculated by correcting the calculated target internal EGR amount INEGRCMD.

Next, a map (not shown) is searched according to the calculated corrected target internal EGR amount CINEGR and the engine speed NE to thereby calculate a target turning angle SAAEXCMD of a turning angle SAAEX (step 123). Then, the lift control input U_SAAEX is calculated according to the calculated target turning angle SAAEXCMD and the actual turning angle SAAEX (step 124), and the actuator 80 is driven according to the calculated lift control input U_SAAEX (step 125). Thus, the turning angle SAAEX is controlled such that it becomes equal to the target turning angle SAAEXCMD.

Next, according to the corrected target internal EGR amount CINEGR, a table (not shown) is searched to thereby calculate a valve-closing crank angle CAEXVC of the exhaust valve 7 (step 126), and a map (not shown) is searched according to the valve-closing crank angle CAEXVC and the turning angle SAAEX to thereby calculate a target cam phase CAEXCMD of the exhaust cam phase CAEX (step 127). Then, a phase control input U_CAEX is calculated according to the calculated target cam phase CAEXCMD and the actual exhaust cam phase CAEX (step 128), and the solenoid valve 54 is driven according to the calculated phase control input U_CAEX (step 129). Thus, the exhaust cam phase CAEX is controlled such that it becomes equal to the target cam phase CAEXCMD.

As described heretofore, according to the present embodiment, when the oil temperature TOIL is not higher than the predetermined temperature TJUD or the engine speed NE is not higher than the predetermined engine speed NEJUD, it is judged that the response of the hydraulically-driven variable exhaust cam phase mechanism 50 is lower than that of the electrically-driven variable exhaust valve lift mechanism 70, so that the phase-priority control process is executed. In the phase-priority control process, the variable exhaust cam phase mechanism 50 is controlled on a priority basis such that the exhaust cam phase CAEX becomes equal to the target cam phase CAEXCMD calculated according to the target internal EGR amount INEGRCMD. Further, the target turning angle SAAEXCMD is determined using the actual exhaust cam phase CAEX attained as a result of the control as a parameter, and the variable exhaust valve lift mechanism 70 is controlled based on the determined target turning angle SAAEXCMD. Thus, the variable exhaust valve lift mechanism 70 is controlled using the actual exhaust cam phase CAEX as a parameter, which makes it possible to control the internal EGR amount with accuracy, in the case where the convergence of the exhaust cam phase CAEX to the target cam phase CAEXCMD is late due to the lower response of the variable exhaust cam phase mechanism 50.

On the other hand, if TOIL>TJUD holds and at the same time NE>NEJUD holds, it is judged that the response of the variable exhaust valve lift mechanism 70 is lower than that of the variable exhaust cam phase mechanism 50, so that the lift-priority control process is carried out. In the lift-priority control process, the variable exhaust valve lift mechanism 70 is controlled on a priority basis, such that the turning angle SAAEX becomes equal to the target turning angle SAAEXCMD calculated according to the target internal EGR amount INEGRCMD. Further, the target cam phase CAEXCMD is determined using the turning angle SAAEX attained as a result of the control as a parameter, and the variable exhaust cam phase mechanism 50 is controlled based on the determined target cam phase CAEXCMD. Thus, the variable exhaust cam phase mechanism 50 is controlled using the actual turning angle SAAEX as a parameter, which makes it possible to control the internal EGR amount with accuracy even when the response of the variable exhaust valve lift mechanism 70 is lower.

The present invention is by no means limited to the above-described embodiments, but may be practiced in various forms. For example, although in the embodiments, the exhaust air temperature and the exhaust pressure as parameters for calculating the corrected target internal EGR amount CINEGR are directly detected by the respective sensors therefor, they may be estimated e.g. based on operating conditions of the engine. Further, although in the embodiments, the target internal EGR amount is calculated according to the engine speed NE and the demanded torque PMCMD, the method of calculation thereof is not limited to this. For example, the target internal EGR amount may be calculated according to the temperature of the inside the cylinder and a target temperature thereof such that the temperature of the inside the cylinder becomes equal to the target temperature. Further, although in the embodiments, injection of fuel is executed by a direct injection method in which fuel is directly injected into each cylinder, the injection may be carried out by a port injection method in which fuel is injected into the intake pipe, or may be carried out by a combination of the two methods.

Further, although in the embodiments, the variable exhaust cam phase mechanism 50 is of a hydraulically-driven type, and the variable exhaust valve lift mechanism 70 is of an electrically-driven type, a combination of these drive methods can be arbitrarily determined. In particular, if the variable exhaust cam phase mechanism 50 is of an electrically-driven type, and the variable exhaust valve lift mechanism 70 is of a hydraulically-driven type, inversely to the embodiments, it is possible to obtain the same advantageous effects by applying the same control method thereto. Further, although in the second embodiment, as parameter representatives of operating conditions of the engine for use in determining which of the phase-priority control process or the lift-priority control process should be carried out, the oil temperature and the engine speed are employed, this is not limitative, but any other suitable parameter(s) may be employed which has/have influence on the response of the variable exhaust cam phase mechanism 50. For example, although in the embodiment, the condition of oil pressure is estimated from the engine speed, the oil pressure may be directly detected, and a detection value thereof may be used as the parameter.

Further, although in the above-described embodiments, the present invention is applied to the gasoline engine installed on an automotive vehicle by way of example, this is not limitative, but it can be applied to various types of engines, such as diesel engines other than gasoline engine, and engines for other than automotive vehicles, such as engines for ship propulsion machines, e.g. an outboard motor having a vertically-disposed crankshaft.

It is further understood by those skilled in the art that the foregoing are preferred embodiments of the invention, and that various changes and modifications may be made without departing from the spirit and scope thereof.

What is claimed is:

1. An internal EGR control system for an internal combustion engine, for controlling internal EGR in which combustion gases are caused to remain in a cylinder, by continuously changing an exhaust cam phase as a phase of an exhaust cam for driving an exhaust valve with respect to a crankshaft, using a variable exhaust cam phase mechanism, and continuously changing a lift of the exhaust valve, using a variable exhaust valve lift mechanism, comprising:
   target internal EGR amount-setting means for setting a target internal EGR amount serving as a target of the internal EGR amount;
   target cam phase-setting means for setting a target cam phase serving as a target of the exhaust cam phase, according to the set target internal EGR amount;
   phase control means for controlling the variable exhaust cam phase mechanism such that the exhaust cam phase becomes equal to the target cam phase;
   actual cam phase-detecting means for detecting an actual exhaust cam phase as an actual cam phase;
   valve-closing timing-calculating means for calculating valve-closing timing of the exhaust valve according to the target internal EGR amount;
   target lift-setting means for setting a target lift of the exhaust valve according to the detected actual cam phase of the exhaust valve and the calculated valve-closing timing of the exhaust valve; and
   lift control means for controlling the variable exhaust valve lift mechanism such that the lift of the exhaust valve becomes equal to the target lift.

2. An internal EGR control system as claimed in claim 1, further comprising:
   exhaust gas temperature-acquiring means for acquiring temperature of exhaust gases exhausted from the engine; and
   target internal EGR amount-correcting means for correcting the target internal EGR amount according to the acquired temperature of the exhaust gases, and
   wherein said target cam phase-setting means sets the target cam phase according to the corrected target internal EGR amount corrected by said target internal EGR amount-correcting means, and
   wherein said valve-closing timing-calculating means calculates the valve-closing timing of the exhaust valve according to the corrected target internal EGR amount.

3. An internal EGR control system as claimed in claim 2, further comprising:
   exhaust gas pressure-acquiring means for acquiring pressure of the exhaust gases, and
   wherein said target internal EGR amount-correcting means corrects the target internal EGR amount further according to the acquired pressure of the exhaust gases.

4. An internal EGR control system as claimed in claim 1, further comprising:
   upper limit value-setting means for setting an upper limit value of the target lift based on the actual cam phase; and
   target lift-restricting means for restricting the target lift to a value not higher than the set upper limit value.

5. An internal EGR control system for an internal combustion engine, for controlling internal EGR in which combustion gases are caused to remain in a cylinder, by continuously changing an exhaust cam phase as a phase of an exhaust cam for driving an exhaust valve with respect to a crankshaft, using a variable exhaust cam phase mechanism, and continuously changing a lift of the exhaust valve, using a variable exhaust valve lift mechanism, comprising:
   actual cam phase-detecting means for detecting an actual exhaust cam phase as an actual cam phase;
   actual lift-detecting means for detecting an actual lift of the exhaust valve as an actual lift;
   target internal EGR amount-setting means for setting a target internal EGR amount serving as a target of the internal EGR amount;
   first control means for carrying out a first control in which the variable exhaust cam phase mechanism is controlled according to the set target internal EGR amount, and the variable exhaust valve lift mechanism is controlled according to the detected actual cam phase of the exhaust valve;
   second control means for carrying out a second control in which the variable exhaust valve lift mechanism is controlled according to the target internal EGR amount, and the variable exhaust cam phase mechanism is controlled according to the detected actual lift of the exhaust valve;
   operating condition-detecting means for detecting an operating condition of the engine; and
   determination means for determining which of the first control and the second control should be executed, depending on the detected operating condition.

6. An internal EGR control system as claimed in claim 5, wherein the variable exhaust cam phase mechanism is a hydraulically-driven mechanism that changes the exhaust cam phase by oil pressure.

7. An internal EGR control system as claimed in claim 1 or 5, wherein the variable exhaust valve lift mechanism has a response higher than that of the variable exhaust cam phase mechanism.

8. An internal EGR control system as claimed in claim 1 or 5, wherein the variable exhaust valve lift mechanism has a control shaft, an upper rocker arm pivotally mounted on the control shaft, a rocker arm shaft, a lower rocker arm pivotally mounted on the rocker arm shaft, and an actuator for actuating the upper and lower rocker arms.

* * * * *